3,268,415
PROCESS FOR THE MANUFACTURE OF 5'-PURINE NUCLEOTIDE BY THE FERMENTATION METHOD
Shukuo Kinoshita and Takashi Nara, Tokyo, and Masanaru Misawa, Kawasaki-shi, Japan, assignors to Kyowa Hakko Kogyo Co., Ltd., Tokyo, Japan, a corporation of Japan
No Drawing. Filed Mar. 23, 1964, Ser. No. 354,095
Claims priority, application Japan, Apr. 10, 1963, 38/17,615; Sept. 10, 1963, 38/47,841
10 Claims. (Cl. 195—28)

This invention relates to an industrial process for the manufacture of 5'-purine nucleotides such as 5'-inosinic acid (hereinafter referred to as 5'-IMP), 5'-guanylic acid (hereinafter referred to as 5'-GMP), 5'-adenylic acid (hereinafter referred to as 5'-AMP) and 5'-xanthylic acid (hereinafter referred to as 5'-XMP) by a fermentative method. This invention is characterized especially by cultivating Brevibacterium ammoniagenes, an adenine-requiring mutant, or a guanine-requiring mutant thereof, in a culture medium containing pantothenic acid and thiamine, their related substances or a natural substance containing the same.

From the results of our study using a chemically defined medium, it has been found that pantothenic acid and thiamine (or their related substances) present in the culture medium play very important roles in fermentations wherein adenine-requiring mutant or guanine-requiring mutant of Brevibacterium ammoniagenes is used. Also they play important roles in fermentations wherein Brevibacterium ammoniagenes ATCC No. 6871 and 6872—the parent strains of said mutants—are used in a culture medium containing purine base, nucleoside or its related substances.

As microorganism useful in the present invention, there are mentioned Brevibacterium ammoniagenes ATCC No. 6781 or 6782 for use in those fermentations in which a culture medium containing purine bases, purine nucleoside or a related substance is employed. There are mentioned adenine-requiring or guanine-requiring mutants derived from above said strains in those direct fermentations in which the culture medium contains pantothenic acid and thiamine, their related substances, or a natural substance containing the same.

Since two parent strains, ATCC No. 6871 and ATCC No. 6872, require biotin as growth factor, the mutants derived from these strains naturally also require biotin for growth.

It is necessary to add a small amount of adenine to adenine-requiring mutant and a small amount of guanine to quanine-requiring mutant. The amount to be added varies with the strains and the culturing conditions, normally about 1–200 μg./ml. as the respective bases.

At the optimum amounts of addition of each base, 5'-IMP is accumulated in case of adenin-requiring mutant and 5'-XMP in the case of guanine-requiring mutant.

In the fermentation employing parent strains (ATCC No. 6871 and 6872) purine base and/or its nucleoside must be added as precurser in an amount more than 0.5 mg./ml. When adding hypoxanthine and inosine, 5'-IMP is accumulated, 5'-GMP is accumulated with the addition of guanine and guanosine, and 5'-AMP is accumulated with the addition of adenine and adenosine. Natural materials containing their precursors can also be employed. For example, the addition of fermentation broth obtained from a culture of microorganisms having hypoxanthine producing ability as hypoxanthine source is possible.

For seed medium and fermentation medium a suitable amount of pantothenic acid, related compound, or natural substance containing the same is added to the basal medium. The amounts used will vary depending upon the specific strain utilized as well as the culture medium. In general the amount added is between about 0.5 to about 50 micrograms/milliliter (μg./ml.) based on the pantothenic acid or related compound. The amount of thiamine present in the medium will likewise vary as the strain and the medium change. It is preferable, however, that in general the medium contain from about 0.1 μg./ml. to about 10 μg./ml. based on the thiamine or related substance.

These substances are added to the basal medium containing a carbon source, an inorganic nitrogen source, inorganic salts, an amino acid source, and other compounds which are necessary for the growth of the microorganism which is used. Among culture constituents, phosphates and magnesium salts are important, and in order to obtain desirable yields, it is necessary to add both of them to effect extremely higher concentration.

The most desirable addition is 0.6–1.5% of $K_2HPO_4$, 0.6–1.5% of $KH_2PO_4$ and 0.6–1.5% of $MgSO_4 \cdot 7H_2O$, and addition should be effected to obtain nearly equal concentration of these three salts. A natural culture medium which contains pantothenic acid and thiamine or their related compounds is well suited for use in the present invention.

For the strains of Brevibacterium ammoniagenes which are used in the present invention, salts of pantothenic acid such as calcium pantothenate, β-alanine, pantethine (or pantethene), coenzyme A and the like are intended as pantothenic acid related substance and may be employed instead of pantothenic acid.

As natural substances containing pantothenic acid which are useful in the instant invention there may be mentioned meat extract, liver extract, rice bran, molasses, fish solubles, and the like.

As natural substances containing thiamine which may be mentioned are those such as rice husk and bran, yeast extract, liver extract, and the like.

As substances which are related to thiamine and which are useful in the instant invention there may be mentioned salts of thiamine such as thiamine hydrochloride, thiamine mononitrate, and the like as well as other related compounds.

Thus the invention is distinguished especially by incorporating a compound of the pantothenic acid series and a compound of the thiamine series in a culture medium used in the fermentation of either (1) Brevibacterium ammoniagenes ATCC No. 6871 or ATCC No. 6872 or (2) an adenine-requiring mutant or guanine-requiring mutant of said Brevibacterium ammoniagenes to form 5'-purine nucleotides such as 5'-IMP, 5'-GMP, 5'-AMP, 5'-XMP, etc. When the fermentation is carried out utilizing the Brevibacterium ammoniagenes ATCC No. 6871 or 6872 it is conducted in the presence of purine base or its nucleoside in the medium. In the case of the fermentation of the adenine or guanine-requiring mutants of the Brevibacterium ammoniagenes the cultivation is carried out in the medium containing a small amount of adenine (for adenine-requiring mutants) or guanine (for guanine-requiring mutants) to form the said 5'-purine nucleotide.

The method of fermentation is substantially the same as other methods. The temperature is 25°–38° C., the optimum being about 30° C. Normally, shaking is desirable for flask and submerged culturing is desirable for tank and jar fermentor. Culturing time is 24–168 hours, amount of 5'-purine nucleotide reaches the maximum with 72–120 hours culturing time.

The following examples are shown as merely embodiments of the present invention and it is not contemplated that the invention is limited thereto. In fact, various modifications may be performed without departing either from the spirit or scope of the present invention. The percent of medium composition described in the following examples shows that of each component dissolved in water, based on total volume.

EXAMPLE 1

*Brevibacterium ammoniagenes* ATCC No. 6872 is cultivated for 24 hrs. after autoclaving (at 120° C. for 15 min.) the seed culture medium containing 2% glucose, 1.0% casamino acids (free from vitamin), 0.1% $K_2HPO_4$, 0.03% $MgSO_4 \cdot 7H_2O$, 0.3% NaCl, 0.01% $FeSO_4 \cdot 7H_2O$ and 30 μg./l. biotin (pH 7.3), and inoculated in a proportion of 10% (volume) to the fermentation medium. Each 30 ml. of the media is poured into a 250 ml. Erlenmeyer flask and used after autoclaving (at 120° C. for 15 min.). The fermentation medium of the following composition is used and the cultivation is performed at 30° C. with stirring.

The composition of fermentation medium: 10% glucose, 1% $K_2HPO_4$, 1% $KH_2PO_4$, 1% $MgSO_4 \cdot 7H_2O$, 0.01% $CaCl_2 \cdot 2H_2O$, 30 μg./l. biotin, 3 mg./ml hypoxanthine, Ca-pantothenate in various concentrations. The pH value is adjusted with 5 N-NaOH to 8.0 before autoclaving (at 120° C. for 15 min.). Following sterilization, 0.6% sterilized urea and thiamine·HCl in various concentrations are added to said medium. The amount of 5'-inosinic acid (Na-salt) accumulated in the cultivating liquor after 96 hrs. is shown in the following Table I.

*Table I*

| Calcium pantothenate added (μg./ml.) | Thiamine HCl added (μg./ml.) | 5'-inosinic acid (Na-salt) formed (mg./ml.) |
| --- | --- | --- |
| 0 | 0 | trace |
| 5 | 0 | trace |
| 0 | 1 | trace |
| 2 | 1 | 8.1 |
| 5 | 0.1 | 6.8 |
| 5 | 1 | 11.1 |

EXAMPLE 2

The cultivation is performed, using the same strain and under cultivation conditions similar to those described in Example 1 with the addition of β-alanine in various concentrations instead of calcium pantothenate. The amount of 5'-inosinic acid (Na-salt) accumulated after 120 hrs. is shown in Table II below.

*Table II*

| β-alanine added (μg./ml.) | Thiamine HCl added (μg./ml.) | 5'-inosinic acid (Na-salt) accumulated (mg./ml.) |
| --- | --- | --- |
| 0 | 1.0 | trace |
| 1 | 1.0 | 7.0 |
| 2 | 1.0 | 9.1 |
| 5 | 1.0 | 11.5 |
| 10 | 1.0 | 11.3 |
| 5 | 0 | trace |
| 5 | 0.1 | 6.1 |
| 5 | 0.5 | 9.7 |

EXAMPLE 3

The same strain as used in Example 1 and the same seed medium as used in Example 1 is used except for adding 1.5% peptone instead of 1.0% casamino acids. The fermentation medium used is one to which suitable amounts of β-alanine, pantethine, coenzyme A and the like and yeast extract, meat extract, liver extract, fish solubles of natural material containing these compounds are added in place of calcium pantothenate, and furthermore to which 1 μg./ml. of thiamine is added. Other cultivation conditions are similar to that of Example 1. The amount of 5'-inosinic acid (Na-salt) accumulated in the fermentation medium after cultivating for 120 hrs. is shown in Table III below.

*Table III*

| Pantothenic acid related compound or natural substance containing the same | Thiamine (μg./ml.) | 5'-inosinic acid (Na-salt) accumulated mg./ml.) |
| --- | --- | --- |
| Not added | 1 | trace |
| β-Alanine, 5 μg./ml | 1 | 11.1 |
| Pantethine, 1 μg./m | 1 | 6.9 |
| Pantethine, 10, μg./ml | 1 | 10.9 |
| Coenzyme A 10, μg./ml | 1 | 7.8 |
| Coenzyme A 40, μg./ml | 1 | 11.0 |
| Yeast extract, 0.5% |  | 11.2 |
| Meat extract, 1.0% | 1 | 10.8 |
| Liver, extract, 0.7% |  | 11.3 |
| Fish solubles, 1.2% | 1 | 10.2 |

EXAMPLE 4

*Brevibacterium ammoniagenes* ATCC No. 6871 is used. The same seed and fermentation medium as used in Example 3 are used and the strain is cultivated adding pantothenic acid (or β-alanine) and thiamine in various concentrations. Other fermentation procedures are similar to that of Example 1. The amount of 5'-inosinic acid (Na-salt) accumulated after cultivating for 96 hrs. is shown as in Table IV below.

*Table IV*

| Compound of pantothenic acid series added | Thiamine added (μg./ml.) | 5'-inosinic acid (Na-salt) accumulated (mg./ml.) |
| --- | --- | --- |
| Not added | Not added | Trace. |
| Calcium pantothenate, 10 μg./ml | Not added | Trace. |
| Not added | 2 | Trace. |
| Calcium pantothenate, 10 μg./ml | 2 | 8.9. |
| β-Alinine, 10 μg./ml | 2 | 9.2. |

EXAMPLE 5

*Br. ammoniagenes* No. 7208, ATCC No. 15187 (adenine-requiring mutant derived from ATCC No. 6872) is used. The medium obtained by adding 50 μg./ml. adenine to the medium described in Example 1 is used as seed medium and the medium obtained by adding 50 μg./ml. adenine to the medium described in Example 1 is used as fermentation medium. The strain is cultivated adding suitable amount of calcium pantothenate (or β-alanine) and thiamine to the fermentation medium. Other cultivation conditions are similar to that of Example 1. The amount of 5'-inosinic acid (Na-salt) accumulated after cultivating for 120 hrs. is shown in Table V below.

*Table V*

| Compound of pantothenic acid series added | Thiamine added (μg./ml.) | 5'-inosinic acid (Na-salt) accumulated (mg./ml.) |
| --- | --- | --- |
| Not added | 2 | Trace. |
| Calcium pantothenate, 10 μg./ml | 2 | 4.9. |
| β-Alanine, 10 μg./ml | 2 | 5.2. |

EXAMPLE 6

*Br. ammoniagenes* No. 7244, ATCC No. 15188 (adenine- and xanthine-requiring mutant derived from ATCC No. 6872) is used. The seed medium and fermentation medium described in Example 5 are used with the addition to each of 40 μg./ml. xanthine. The medium without the addition of and the medium with the addition of 10 μg./ml. calcium pantothenate and 1 μg./ml. thiamine are cultivated respectively. Other cultivation conditions are similar to that of Example 1. The amount of 5'-inosinic acid (Na-salt) accumulated after cultivating for 120 hrs. is trace in the case where no vitamin is added and 5.1 mg./ml. in the case where both vitamins are added.

EXAMPLE 7

Br. ammoniagenes No. 7309, ATCC No. 15312 (adenine-requiring mutant derived from ATCC No. 6872) is used and the seed medium and fermentation medium described in Example 5 in which the amount of adenine added is 5 µg./ml. are used. The medium without the addition of and the medium with the addition of 10 µg./ml. calcium pantothenate and 1 µg./ml. thiamine are cultivated respectively. Other cultivation conditions are similar to that of Example 1. The amount of 5'-inosinic acid accumulated after cultivating for 96 hrs. is trace in the case where no vitamin is added and 6.3 mg./ml. in the case where both vitamins are added.

EXAMPLE 8

The same strain and culture medium as described in Example 7 are used and the fermentation medium to which is added β-alanine, pantethine, coenzyme A and natural substance containing β-alanine, pantethine and coenzyme A as a substitute for calcium pantothenate are used. Other cultivation conditions are similar to that of Example 1. The amount of 5'-inosinic acid (Na-salt) accumulated after cultivating for 120 hrs. is shown in Table VI below.

Table VI

| Pantothenic acid related compound or natural substance containing the same | Thiamine added (µg./ml.) | 5'-inosinic acid l(Na-salt) accumulated (mg./ml.) |
|---|---|---|
| Not added | 1 | Trace |
| β-Alanine, 10 µg./ml | 1 | 5.9 |
| Pantethine, 10 µg./ml | 1 | 5.0 |
| Coenzyme A, 40 µg./ml | 1 | 4.9 |
| Yeast extract, 1% | | 6.3 |
| Liver extract, 0.7% | | 6.1 |
| Meat extract, 0.4% | | 5.9 |

EXAMPLE 9

Br. ammoniagenes 7320, ATCC No. 15190 (adenine-requiring mutant derived from ATCC No. 6871) is used, and other cultivation conditions are similar to that of Example 5. After cultivating for 96 hrs., 4.2 mg./ml. of 5'-inosinic acid (Na-salt) is accumulated in the medium which is obtained by adding 5 µg./ml. β-alanine and 1 µg./ml. thiamine to the fermentation medium. On the other hand, 5'-inosinic acid is only slightly accumulated in the medium free from both vitamins.

EXAMPLE 10

The same strain and seed medium as in Example 1 are used, the medium which is obtained by adding 0.3% peptone to the fermentation medium described in Example 1 without hypoxanthine is used. Pantothenic acid or its related compound and thiamine are added thereto in various concentrations. The addition of guanine during the growth is performed in such manner that 2 mg./ml. guanine is obtained after cultivating for 72 hrs. Other cultivation conditions are similar to that of Example 1. The amount of 5'-guanylic acid (Na-salt) accumulated in the cultivating liquor after cultivating for 96 hrs. is shown in Table VII below.

Table VII

| Pantothenic acid related compound added (µg./ml.) | Thiamine HCl added (µg./ml.) | 5'-guanylic acid (Na-salt) accumulated (mg./ml.) |
|---|---|---|
| Calcium pantothenate, 10 | 0 | Trace |
| Not added | 2 | Trace |
| Calcium pantothenate, 10 | 2 | 3.9 |
| β-Alanine, 10 | 2 | 4.1 |
| Pantethine, 5 | 2 | 4.9 |
| Coenzyme A, 30 | 2 | 4.8 |

EXAMPLE 11

The same strain and seed medium as described in Example 1 are used and the fermentation medium similar to that of Example 10, to which 5µg./ml. pantothenic acid and 1 µg./ml. thiamine·HCl are added, is used. The addition is performed in such manner that 2.5 mg./ml. adenine is obtained after cultivating for 48 hrs. Other cultivation conditions are similar to that of Example 1. 6.5 mg./ml. of 5'-adenylic acid is accumulated in the cultivating liquor after cultivating for 96 hrs. When either pantothenic acid or thiamine is omitted, 5'-adenylic acid is only slightly accumulated.

EXAMPLE 12

Br. ammoniagenes ATCC No. 6871 is used. The seed medium and fermentation medium described in Example 10 are used and the component added in such manner that 2.0 mg./ml. guanine or adenine is obtained after cultivating for 48 hrs. Other cultivation conditions are similar to that of Example 1. Thus, in the cultivating liquor after cultivating for 96 hrs., 4.8 mg./ml. of 5'-guanylic acid (Na-salt) is accumulated in the case where guanine is added and 5.1 mg./ml. of 5'-adenylic acid is accumulated in the case where adenine is added. When either pantothenic acid or thiamine is omitted, 5'-guanylic or 5'-adenylic acid is only slightly accumulated.

EXAMPLE 13

Br. ammoniagenes No. 62221, ATCC 15138 (guanine-requiring mutant) is used. The medium used is one which is obtained by adding 10 µg./ml. guanine to the seed medium described in Example 1. The fermentation medium described in Example 1, to which 15 µg./ml. guanine is added instead of hypoxanthine and pantethine acid (or pantethine, coenzyme A) and thiamine·HCl are added in varied concentration, is used. Other cultivation conditions are similar to that of Example 1. The amount of 5'-xanthylic acid (Na-salt) accumulated after cultivating for 120 hrs. is shown in Table VIII below.

Table VIII

| Pantothenic acid related compound added (µg./ml.) | Thiamine added (µg./ml.) | 5'-xanthylic acid (Na-salt) accumulated (mg.ml.) |
|---|---|---|
| Calcium pantothenate, 5 | 0 | trace |
| Not added | 1 | trace |
| Calcium pantothenate, 5 | 1 | 7.2 |
| Pantethine, 4 | 1 | 7.5 |
| Coenzyme A, 25 | 1 | 7.6 |

What is claimed is:

1. A process for the manufacture of 5'-purine nucleotide selected from the group consisting of 5'-inosinic acid, 5'-guanylic acid, 5'-adenylic acid and 5'-xanthylic acid, wherein one of the microorganisms Brevibacterium ammoniagenes ATCC No. 6871, Brevibacterium ammoniagenes ATCC No. 6872 and mutants thereof, is cultivated in a culture medium containing (1) from about 0.5 to about 50 micrograms per milliliter of a member selected from the group consisting of pantothenic acid, pantothenic acid-yielding substance, β-alanine, pantethene and coenzyme A and (2) from about 0.1 to about 10 micrograms per milliliter of a member selected from the group consisting of thiamine, thiamine hydrohalide and thiamine-yielding substance, said culture medium also containing biotin and a purine base or a nucleoside thereof, until essentially maximum accumulation of objective 5'-nucleotide has been achieved, and then recovering the thus-accumulated 5-nucleotide from the culture medium.

2. A process according to claim 1, wherein the culture medium contains 0.6–1.5% of $K_2HPO_4$, 0.6–1.5% of $KH_2PO_4$ and 0.6–1.5% of $MgSO_4 \cdot 7H_2O$.

3. A process according to claim 2 wherein the culture medium also contains a growth-promoting amount of biotin and an amount of a purine base selected from the group consisting of adenine, xanthine, guanine and mixture thereof to satisfy the purine base requirement of the microorganism.

4. A process as claimed in claim 1 wherein the microorganism is *Brevibacterium ammoniagenes* ATCC No. 6871.

5. A process as claimed in claim 1 wherein the microorganism is *Brevibacterium ammoniagenes* ATCC No. 6872.

6. A process as claimed in claim 3 wherein the microorganism is *Brevibacterium ammoniagenes* No. 7208 (ATCC No. 15187).

7. A process as claimed in claim 3 wherein the microorganism is *Brevibacterium ammoniagenes* No. 7244 (ATCC No. 15188).

8. A process as claimed in claim 3 wherein the microorganism is *Brevibacterium ammoniagenes* No. 7309 (ATCC No. 15312).

9. A process as claimed in claim 3 wherein the microorganism is *Brevibacterium ammoniagenes* No. 7320 (ATCC No. 15190).

10. A process as claimed in claim 3 wherein the microorganism is *Brevibacterium ammoniagenes* No. 62221 (ATCC No. 15138).

References Cited by the Examiner
UNITED STATES PATENTS

| | | | |
|---|---|---|---|
| 3,118,820 | 1/1964 | Uchida et al. | 195—28 |
| 3,135,666 | 6/1964 | Hara et al. | 195—28 |
| 3,152,966 | 10/1964 | Kinoshita et al. | 195—28 |

FOREIGN PATENTS 1,316,247  12/1962  France.

OTHER REFERENCES

Rose: The Condensed Chemical Dictionary, 5th edition, Reinhold Publishing Corp., New York, N.Y., page 820 (1956).

Werkman et al.: Bacterial Physiology, Academic Press Inc., New York, N.Y., pages 223–241 (1951).

A. LOUIS MONACELL, *Primary Examiner.*

ALVIN E. TANENHOLTZ, *Examiner.*